(12) United States Patent
Ohishi et al.

(10) Patent No.: US 6,385,535 B2
(45) Date of Patent: May 7, 2002

(54) NAVIGATION SYSTEM

(75) Inventors: Tetsuya Ohishi; Kiyoto Hiruta; Tatsuki Nakamura; Hiroshi Shishido; Hiroyuki Nemoto; Koji Hayashida, all of Iwaki (JP); Fumio Saito, Leonia, NJ (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/828,421

(22) Filed: Apr. 5, 2001

(30) Foreign Application Priority Data

Apr. 7, 2000 (JP) ........................................ 2000-106207

(51) Int. Cl.[7] .............................................. G01C 21/00
(52) U.S. Cl. ........................ 701/209; 701/211; 704/231; 704/246; 340/495
(58) Field of Search ................................ 701/209, 211, 701/210, 201; 340/990, 995; 704/200, 275, 231, 246, 247, 251; 381/42, 92, 86

(56) References Cited

U.S. PATENT DOCUMENTS 6,175,803 B1 * 1/2001 Chowanic et al. .......... 340/988
6,230,136 B1 * 5/2001 Yamamoto et al. ......... 704/212

* cited by examiner

*Primary Examiner*—Tan Nguyen
(74) *Attorney, Agent, or Firm*—Brinks Hofer Gilson Lione

(57) ABSTRACT

A navigation system having a navigation controller includes a voice recognition unit for recognizing a predetermined word from the spoken utterances of a user. It also includes a destination supposition and suggestion unit for predicting an appropriate destination desired by a user, based on a user's speech, and audibly suggests the predicted destination, and destination entry unit. If the suggested destination satisfies a user, the destination entry unit enters into the navigation controller the suggested destination.

19 Claims, 8 Drawing Sheets

FIG. 3A

| "RECREATION" WORD DATABASE |
|---|
| SOMEWHERE EXCITING |
| WHERE? |
| BORING |
| RECREATION AREA |

FIG. 3B

| "DINING" WORD DATABASE |
|---|
| HUNGRY |
| EAT |
| RESTAURANT |

FIG. 3C

| "RELAXATION" WORD DATABASE |
|---|
| RESTROOM |
| TIRED |
| REST SPOT |
| THIRSTY |

FIG. 4A

| USER PREFERENCE DATABASE (RECREATION) |
|---|
| 1. EVENTS (1) CONCERTS<br>(2) ART EXHIBITS<br>(3) CERAMICS EXHIBITS<br>(4) SPORTING EVENTS<br>(5) ATTRACTIONS (CIRCUSES)<br>(6) FLOWER SHOWS |
| 2. EXERCISE (1) SWIMMING<br>(2) GYM<br>(3) JOGGING<br>(4) SKIING (INDOOR)<br>(5) SKATING (INDOOR)<br>(6) GOLF (DRIVING RANGE) |
| 3. RECREATION (1) DANCING<br>(2) BILLIARDS<br>(3) GAME CENTER<br>(4) PACHINKO |
| 4. CINEMA (1) FOREIGN FILMS<br>(2) JAPANESE FILMS |
| 5. SHOPPING (1) ELECTRICAL APPLIANCES<br>(2) CLOTHING<br>(3) FOOTWEAR<br>(4) FOOD |
| 6. AMUSEMENT PARKS<br>--- |

FIG. 4B

| USER PREFERENCE DATABASE (DINING) |
|---|
| RAMEN NOODLES |
| JAPANESE NOODLES |
| CURRY |
| GRILLED BEEF |
| CHINESE FOOD |
| FRENCH CUISINE |
| ITALIAN FOOD |
| INDIAN FOOD |
| FASTFOOD |
| CONVENIENCE-STORE FOOD |
| ------ |

FIG. 4C

| USER PREFERENCE DATABASE (RELAXATION) |
|---|
| EXPRESSWAY SERVICE AREA |
| COFFEE SHOPS |
| FAMILY RESTAURANTS |
| FASTFOOD SHOPS |
| CONVENIENCE STORES |
| ------ |

FIG. 5

| FACILITIES NAME | LOCATION (LATITUDE AND LONGITUDE) | FACILITIES TYPE | FEE | OPENING TIME | CLOSING TIME | DETAILED INFORMATION |
|---|---|---|---|---|---|---|
|  |  |  |  |  |  |  |

FIG. 6

| EVENT TYPE | FACILITIES WHERE EVENT IS HELD | LOCATION | FEE | OPENING TIME | CLOSING TIME | DETAILED INFORMATION |
|---|---|---|---|---|---|---|
|  |  |  |  |  |  |  |

NAVIGATION SYSTEM

BACKGROUND OF THE INVENTION

1. Field of the Invention

The present invention generally relates to navigation systems, and more particularly to an on-vehicle navigation system, capable of predicting a system user's destination preferences from a user's speech. Based on the system's prediction, the system suggests an appropriate destination, and navigates the vehicle to a final destination.

2. Description of the Related Art

With the popularity of networks such as mobile communication networks, the Internet, satellite communication networks, and mobile terminals such as cellular phone terminals and personal digital assistants (PDAs), vehicle compartments are no longer restricted from using forms of communication. This enables on-vehicle devices to freely communicate with external devices for transmission/reception of information. For example, desired information such as event information, traffic information, and weather information can be obtained from external information providers, the Internet, or homepages over mobile communication networks. Drastic improvements in the performance of computers, or LSI (large scale integrated) chips, have allowed speech recognition techniques to be significantly improved. As a result, a word-spotting technique has been developed in which a preset keyword can be extracted from a user's speech.

Typically, an on-vehicle navigation system is useful to find a route to a final destination, to display the found route, along with a map covering the vehicle position and the neighborhood, and to navigate the vehicle to the final destination. In such a navigation system, a final destination is entered by a remote controller through key operation, or by using a speech recognition function. Accordingly, once a final destination has been decided, the final destination is entered into the navigation system.

However, even when a user of a vehicle navigation system has not decided upon a final destination, the user often desires to go somewhere for recreation, to eat, or to rest. Such a desire is often expressed through a user's speech during conversation. As a result, it is convenient to provide a system capable of predicting user preferences from a user's speech during conversation. It would be beneficial for such a system to suggest an appropriate destination, to set a suggested destination as the final destination that would satisfy the user, and to find a route to the destination.

SUMMARY OF THE INVENTION

In view of the foregoing needs, an intelligent vehicle navigation has been developed. It provides for a navigation system capable of (1) obtaining and storing information such as event information, traffic information, and weather information by using existing forms of communication, and (2) predicting a system user's destination preferences by utilizing speech recognition techniques to suggest an appropriate destination, to derive a user's desired destination, and to navigate a user to the desired destination.

One embodiment of a navigation system having a navigation controller includes a voice recognition unit for recognizing predetermined words spoken by a system's user. This embodiment also includes a destination supposition and suggestion unit for predicting an appropriate destination, based on a user's speech, and for audibly suggesting the predicted destination. Further, this embodiment includes a destination entry unit which enters the suggested destination as the final destination for the navigation controller, if the suggested destination satisfies the user. If the suggested destination does not satisfy the user, another appropriate destination may be suggested.

In another embodiment, the navigation system further includes a word data storage, a preference data storage, a facilities information storage, and an event information collection/storage. The word data storage contains words determining a user's desired destination. The words are used to determine that a user has certain preferences such as recreation preferences or dining preferences. The preference data storage contains preference data for a user's preferences. The facilities information storage contains facilities information, including the facility name and facility type, for each facility. The event information collection/storage collects and stores event information for each event, including the type of event, and the facilities where the event is being held. The destination supposition and suggestion unit may suggest an appropriate destination type to a user according to a user's preferences as determined by the voice recognition unit. Additionally, the destination and suggestion unit searches the destination types that would satisfy a user, based on the event information or facilities information, to suggest an appropriate destination.

In yet another embodiment, the navigation system further includes a selection history data storage for storing items selected by a user as history data. The destination supposition and suggestion unit may determine and suggest an appropriate destination type or destination based on the history data.

The navigation system provides a mechanism to set a final destination through audible interactions between the navigation system and a user while allowing a user to focus on driving. The navigation system may suggest an appropriate destination or destination type based on traffic information, anticipated time, weather information, history data, etc., to aid a user.

BRIEF DESCRIPTION OF THE DRAWINGS

FIGS. 3A to 3C illustrate example keywords associated with the "recreation", "dining", and "relaxation" preferences, respectively.

FIGS. 4A to 4C illustrate examples of user preference items (types) for "recreation", "dining", and "relaxation" databases, respectively.

FIG. 5 illustrates data examples relevant to facilities information.

FIG. 6 illustrates data examples relevant to event information.

DESCRIPTION OF THE PREFERRED EMBODIMENTS

Figure 1:
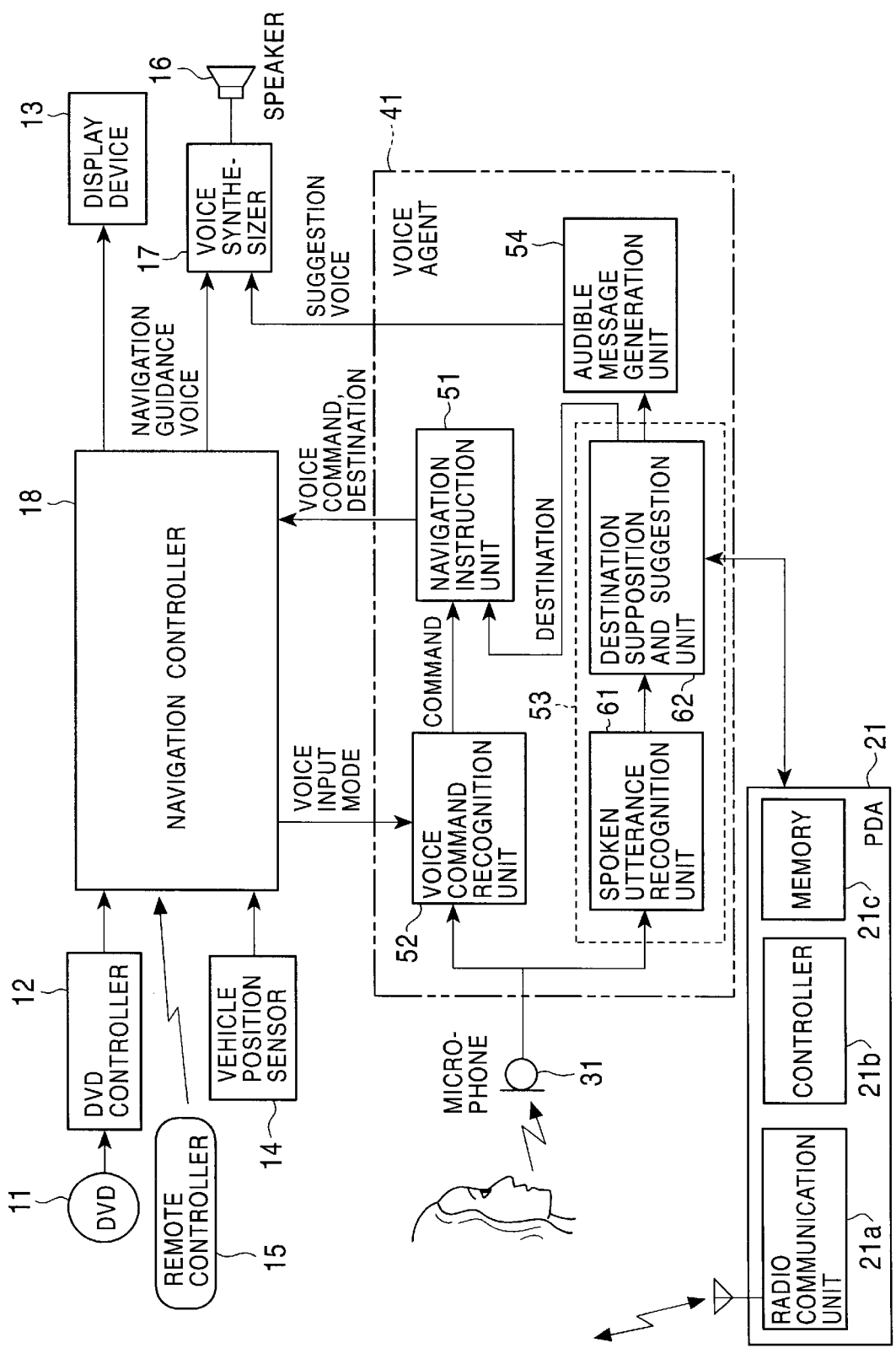
FIG. 1 is a block diagram showing the overall structure of a navigation system according to one embodiment of the present invention.

FIG. 1 is a block diagram showing an embodiment of a navigation system according to the present invention.

Referring to FIG. 1, an on-vehicle navigation system includes a map data storage unit 11 such as a digital video disk (DVD) for storing map data, a DVD controller 12 for reading the map data from the DVD 11, a display device 13 such as a CRT (cathode ray tube) for displaying a map image of the vehicle position and the neighborhood together with the vehicle position mark and the guidance route, a vehicle position sensor 14, a remote controller 15, a speaker 16, a voice synthesizer 17, and a navigation controller 18. The remote controller 15 is used to select items from menus, instruct an audible command input, or scroll through the map image. The speaker 16 enables voice output for route guidance, or voice output for suggestion of appropriate destination types or destinations. The navigation controller 18 acts to (1) generate a map image covering the vehicle position and the neighborhood from the read map data, (2) find a route to the final destination, and (3) generate an image including a vehicle position mark and a guidance route.

A PDA terminal 21 includes a radio communication unit 21a, a controller 21b, and a memory 21c. Various information such as event information, traffic information or weather information, obtained from outside over the radio communication networks or the Internet, is stored in the memory 21c.

The navigation system further includes a microphone 31 for receiving a user's speech (also referred to as "spoken utterances"), and a voice agent 41. As used herein, a "user" is a vehicle occupant who rides in the vehicle. The voice agent 41 functions (1) to recognize commands input through a user's speech to direct the commands to the navigation controller 18, and (2) to predict and suggest an appropriate destination desired by a user based on a user's speech, and enters the destination to the navigation controller 18 as the final destination.

The voice agent 41 includes a navigation instruction unit 51, a voice command recognition unit 52, a voice recognition/destination supposition and suggestion unit 53, and an audible message generation unit 54.

The voice command recognition unit 52 recognizes a voice command from a user in a voice command input mode, and enters the recognized voice command to the navigation instruction unit 51. The navigation instruction unit 51 then utilizes the entered voice command to instruct the navigation controller 18.

The voice recognition/destination supposition and suggestion unit 53, which includes a spoken utterance recognition unit 61 and a destination supposition and suggestion unit 62, predicts and suggests an appropriate destination desired by a user based on a user's speech. It then determines a user's final desired destination. Through the navigation instruction unit 51, the predicted destination is entered as the final destination to the navigation controller 18. A message on the destination directed from the voice recognition/destination supposition and suggestion unit 53 is converted into an audio signal by the audible message generation unit 54, and is output therefrom.

Figure 2:
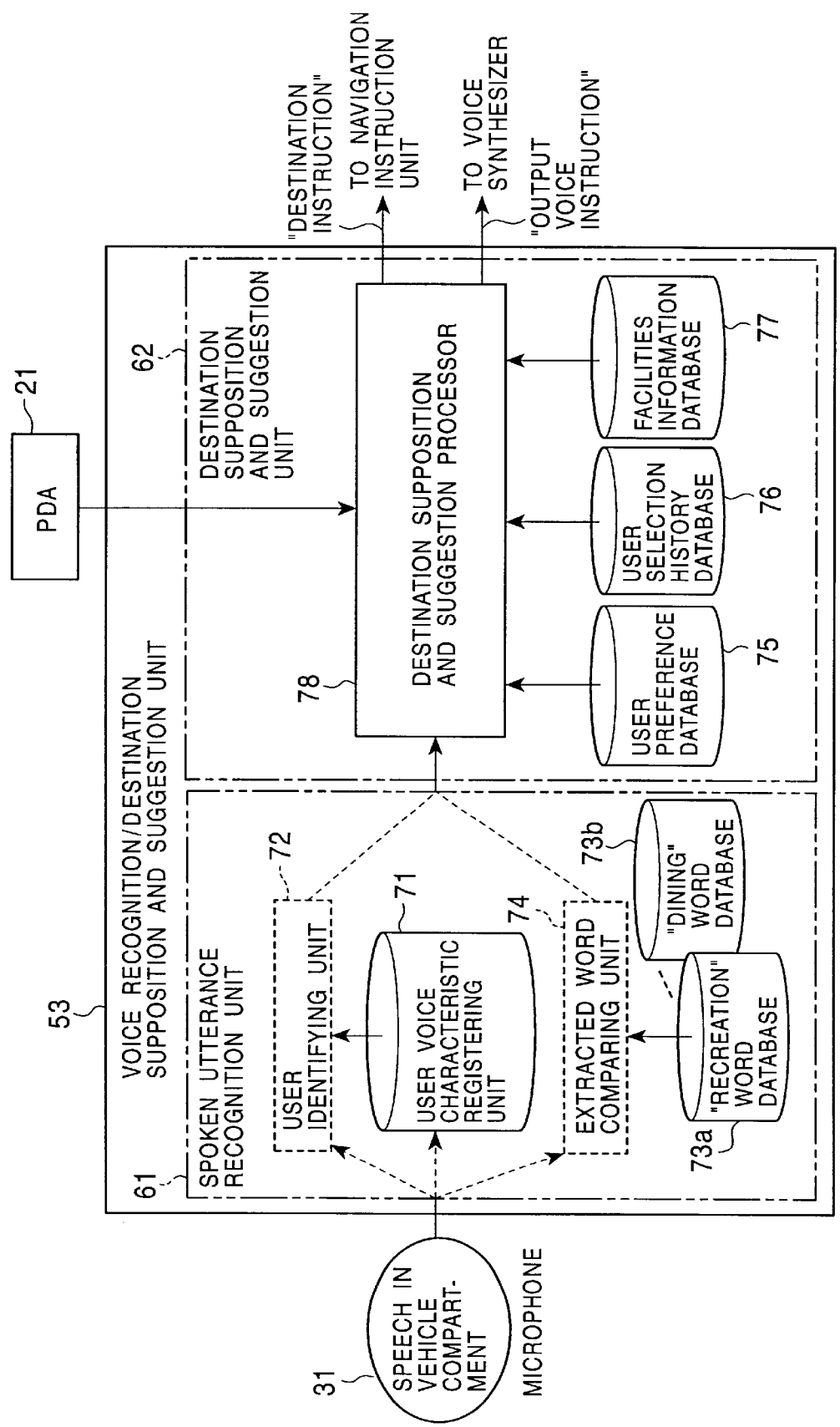
FIG. 2 is a block diagram showing a voice recognition/destination supposition and suggestion unit for the navigation system shown in FIG. 1.

FIG. 2 is a block diagram showing one embodiment of a voice recognition/destination supposition and suggestion unit 53.

Referring to FIG. 2, the spoken utterance recognition unit 61 includes a user voice characteristic registering unit 71 and a user identifying unit 72. The characteristics of the voice of a user (vehicle occupant) who frequently rides in a vehicle with the system, are previously registered in the user voice characteristic registering unit 71. The user identifying unit 72 identifies a user who is currently in the vehicle compartment from the characteristics of a user's voice which show up during a user's speech. Specifically, a user who is currently in the vehicle compartment is identified by comparing such a user's spoken utterances with the voice data registered in the user voice characteristic registering unit 71 to specify what user's speech has the maximum similarity.

The spoken utterance recognition unit 61 further includes word databases 73a, 73b, etc., containing words (keywords) classified by desire or preference types. Some keywords for "recreation preferences", "dining preferences", and "relaxation preferences" are illustrated by way of examples in FIGS. 3A to 3C, respectively.

Referring to FIG. 3A, keywords for "recreation preferences" include the words and phrases underlined in the following spoken utterances:

"Do you know somewhere exciting?"

"Where do you want to go?"

"I'm bored"

"Do you know any new recreation area?"

The words associated with "recreation preferences" appear even in objectiveless situations, and are more diverse than the words associated for situations for other preferences such as "dining preferences", "relaxation preferences", and "accommodation preferences". As a result, words in situations with unclear objectives or situations without objectives are associated with "recreation preferences".

As shown in FIG. 3B, example keywords for "dining preferences" include "hungry", "eat", "restaurant", and "lunch". As shown in FIG. 3C, example keywords for "relaxation preferences" include "restroom", "tired", "rest spot", and "thirsty".

The spoken utterance recognition unit 61 further includes an extracted word comparing unit 74 for comparing an extracted word, using a word spotting technique, with the keywords registered in the word databases 73a, 73b, etc. In such manner, it may be determined whether a user has "recreation preferences", "dining preferences", or "relaxation preferences". For example, if the words associated with "recreation preferences" such as "somewhere exciting", "where", "boring" and "recreation area," appear in conversation, it is determined that a user has "recreation preferences". In a similar fashion, when the keywords associated with "dining preferences", and "relaxation preferences" appear in conversation, it is determined that a user has "dining preferences" and "relaxation preferences", respectively.

The destination supposition and suggestion unit 62 includes various databases, such as a user preference database 75, a user selection history database 76, and a facilities information database 77.

The user preference database 75 contains user preference data classified by "recreation preferences", "dining preferences", and "relaxation preferences".

As shown in FIG. 4A, the preference items (recreation types) of "recreation preferences" include (1) "events", (2) "exercise (physical exercise)", (3) "indoor recreation", (4) "cinema", (5) "shopping", and (6) "amusement parks". Each item is further classified. For example, the item "events" is subclassified as "concerts", "art exhibits", "ceramics exhibits", "sporting events", "attractions (circuses)", "flower shows", "expos", etc.

As described in FIG. 4B, the preference items (food types) of "dining preferences" include "ramen noodles", "Japanese noodles", "curry", "grilled beef", and "Chinese food". In FIG. 4C, the preference items (relaxation area types) of "relaxation preferences" include "expressway service area", "coffee shops", "family restaurants", and "fast-food shops".

The user selection history database 76 contains, as history data, recreation types and areas for the "recreation preferences" which have been selected by a user. Similarly, among other types of history data, it contains, food types and shops for the "dining preferences" which have been selected by the user.

Generally, once a user has visited a certain recreation area, a user is less likely to desire to go to that recreation area again soon. With reference to the history data of the "recreation" database, a recreation area that a user has visited recently has a lower probability of being selected as a final destination.

However, restaurants a user frequently visits have a high probability of being selected. For example, if a user selects ramen noodle shops as the desired food shop type (destination type), the ramen shop (for example, the Kurumaya Ramen Noodle chain) that a user recently visited is searched with reference to the history data of the "dining" database. Because such a user recently visited the Kurumaya Ramen Noodle chain, the Kurumaya Ramen Noodle chain has a high probability of being selected as the final destination.

The facilities information database 77, as shown in FIG. 5, contains information about facilities. For example, it contains information such as department stores, banks, restaurants, and public facilities, including the name, location, type, fee (if desired), opening/closing times, and other details about the facilities.

As shown in FIG. 6, the PDA terminal 21 may obtain information such as event type, facilities where an event is held, location, fee, opening/closing times, and other details of an event. Such information is obtained from homepages of the facilities, event companies, and the local government, and stored in the memory 21c. The PDA terminal 21 may also obtain other information such as traffic information, or weather information from information providing companies, and likewise store it in the memory 21c.

A destination supposition and suggestion processor 78 predicts and audibly suggests an appropriate destination type desired by a user based on information such as user preference data, history data, facilities information, event information, traffic information, and weather information. When the suggested destination type satisfies a user, an appropriate destination is suggested with reference to the event information or the facilities information. When the suggested destination satisfies a user, that destination is entered through the navigation instruction unit 51 as the final destination to the navigation instruction controller 18.

Figure 7:
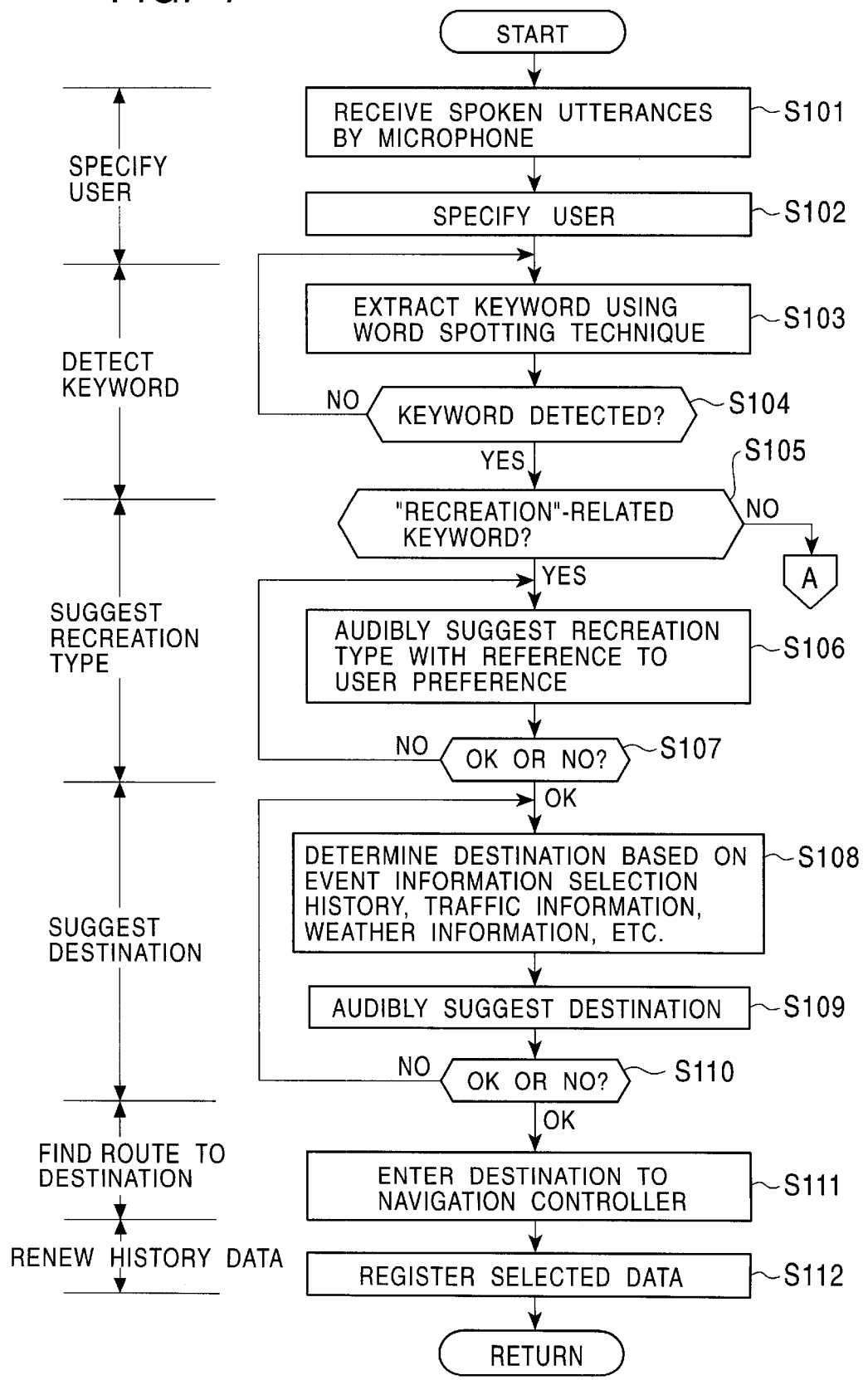
FIG. 7 is a flowchart of a destination predicting and suggesting process.
Figure 8:
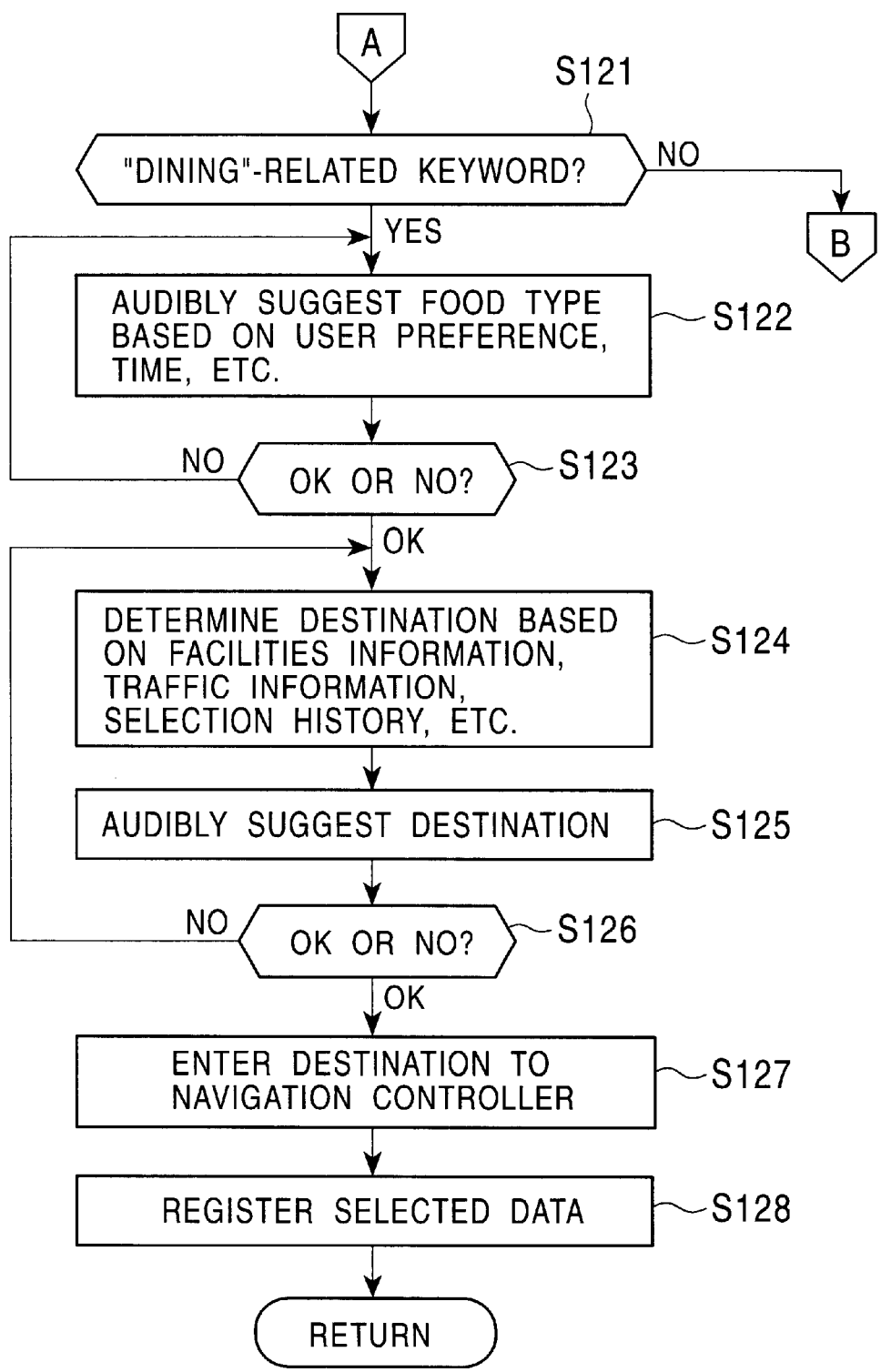
FIG. 8 is another flowchart of the destination predicting and suggesting process.
Figure 9:
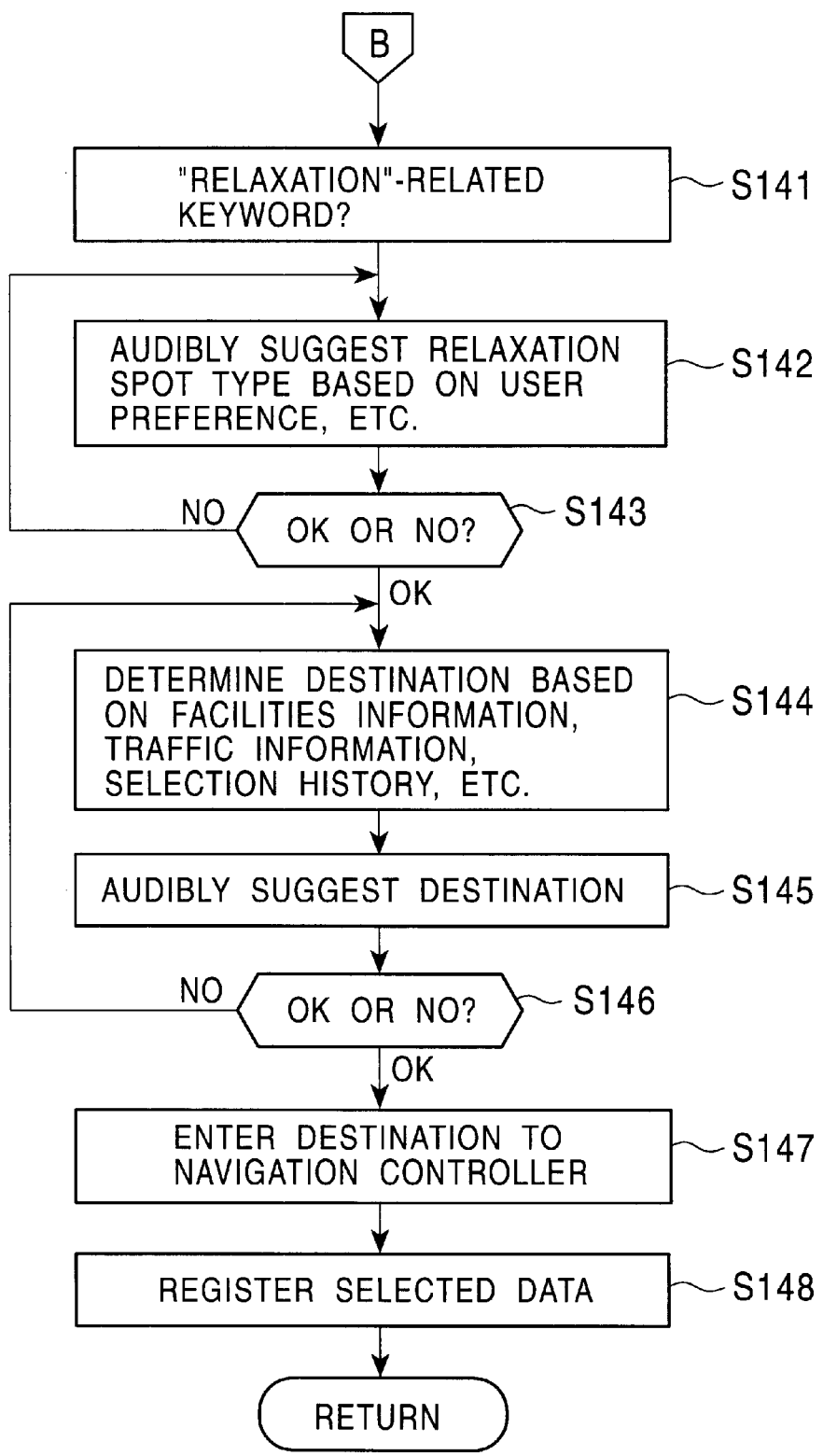
FIG. 9 is yet another flowchart of the destination predicting and suggesting process.

FIGS. 7 to 9 are flowcharts of embodiments of a destination predicting and suggesting process according to the present invention.

The spoken utterances (in conversation or a monologue) of a user in a vehicle compartment are picked up by the microphone 31 (S101). The spoken utterance recognition unit 61 identifies a user who is currently in the vehicle compartment from the characteristics of a user's voice contained in such a user's spoken utterances (S102). After a user is identified, if a keyword is spoken, it is extracted from a user's speech utilizing a word spotting technique (S103). If a keyword is detected (YES at S104), it is determined whether or not the extracted keyword is a "recreation"-related keyword (S105). If the keyword is a "recreation"-related keyword, it is determined that such a user has "recreation preferences", and the determination result is passed to the destination supposition and suggestion processor 78. For example, in the following spoken utterances:

Driver: "Do you know somewhere exciting?"

Passenger: "Let me see . . . "

the keyword "somewhere exciting" contained within the "recreation preferences" is detected, and it is determined that the vehicle occupants have "recreation preferences". In another example, in the following spoken utterances:

Driver: "Where do you want to go?"

Passenger: "Well . . . "

the keyword "where" contained within the "recreation preferences" is detected, and it is determined that the vehicle occupants have "recreation preferences".

Upon receipt of the determination result that a user has "recreation preferences", the destination supposition and suggestion processor 78 refers to such a user's preference database 75 to find such a user's recreation preferences. It then audibly suggests an appropriate recreation type (S106). For example, when one candidate recreation type is predicted as being "sporting events", the destination supposition and suggestion processor 78 may suggest as follows:

"Would you like information about a sporting event?" (1a)

Alternatively, if one candidate recreation type is predicted as being "amusement parks", the destination supposition and suggestion processor 78 may suggest as follows:

"How about amusement parks?" (2a)

When the suggested recreation type does not satisfy a user (S107), another candidate recreation type is suggested. The same procedure is repeated until a suggested recreation type satisfies a user. For example, if a user responds to the suggestion (1a), by:

"Yes, please." (1b)

or if a user responds to the suggestion (2b), by:

"Which amusement park?" (2b)

then the process proceeds to S108. Specifically, an appropriate destination is determined (S108) based on information such as event information, history data, traffic information, and weather information, to audibly suggest an appropriate destination (S109).

For example, in response to an acceptance (1b), the facility that requires the shortest travel time, among facilities where sporting events are being held, is chosen with reference to the event information. An appropriate destination (for example, the Seibu Stadium) may then be suggested. For example, the suggestion maybe:

"How about the Seibu Lions baseball team vs. the Daiei Hawks baseball team at the Seibu Stadium? It will take 55 minutes to go there."

Alternatively, in response to the inquiry (2b), an appropriate destination (for example, the Yomiuri Amusement Park) may be suggested as follows.

"How about the Yomiuri Amusement Park? A flower show is being held there."

If the suggested destination does not satisfy a user, i.e., if NO is given at S110, another recreation area is suggested. The same procedure is repeated until a suggested destination of "recreation preferences" satisfies a user. The destination supposition and suggestion processor 78 then enters, through the navigation instruction unit 51, the suggested destination which satisfies a user, as the final destination to the navigation controller 18, (see FIG. 1) (S111). Accordingly, the navigation controller 18 finds a route to the entered destination, and navigates the vehicle to that destination. The destination supposition and suggestion processor 78 further records the selected recreation type and area as history data in the user selection history database 76 (S112). The process returns to the start step, and the same procedure is repeatedly performed.

If NO is given at S105, i.e., if the extracted word is not a "recreation"-related keyword, the process proceeds to S121, as shown in FIG. 8, in which it is determined whether or not the extracted word is a "dining"-related keyword. If the extracted word is a "dining"-related keyword, i.e., YES at S121, then it is determined that a user has "dining preferences", and the determination result is passed to the destination supposition and suggestion processor 78. For example, in the following conversation:

Driver: "I'm hungry. How about you?"
Passenger: "Uh-huh."

the keyword "hungry" contained within "dining preferences" is detected, and it is determined that the vehicle occupants have "dining preferences".

Upon receipt of the determination result that a user has "dining preferences", the destination supposition and suggestion processor 78 refers to the user preference database 75 to find a user's preference relevant to the "dining preferences". It then audibly suggests one candidate food type based on that preference and the current time (S122). For example, if it is lunch time, the destination supposition and suggestion processor 78 suggests as follows:

"Would you like information about a ramen noodle shop?" (3a)

If the suggested food type does not satisfy a user, i.e., NO at S123, then another candidate food type is suggested. The same procedure is repeated until a suggested food type satisfies a user, and, for example, if a user responds to the suggestion (3a) as follows.

"Yes, please." (3b)

then the process proceeds to S124. Specifically, an appropriate destination is determined based on information such as facilities information, traffic information, and history data (S124), to audibly suggest an appropriate destination (S125).

For example, in response to an acceptance (3b), with reference to the user selection history database 76, it is determined that a user's favorable ramen shop is "the Kurumaya Ramen Noodle chain". As a result, "the Kurumaya Ramen Noodle chain" data is searched from the facilities information database 77, and a candidate "Kurumaya Ramen Noodle chain store," which requires the shortest travel time, is suggested. For example, one destination candidate (Kurumaya Ramen Noodle chain, Mitonishi store) is suggested as follows.

"How about the Kurumaya Ramen Noodle chain, Mitonishi store? It will take 10 minutes to go there."

If the suggested destination does not satisfy a user, i.e., NO at S126, then another candidate food shop (destination) is suggested. The same operation is repeatedly performed until a suggested destination satisfies a user. The destination supposition and suggestion processor 78 then enters, through the navigation instruction unit 51, the suggested destination which satisfies a user, as the final destination to the navigation controller 18 (see FIG. 1) (S127). The navigation controller 18 then finds a route to the entered destination, and navigates the vehicle to that destination. The destination supposition and suggestion processor 78 records the selected food type and shop as history data in the user selection history database 76 (S128). The process then returns to the start step, and the same operation is repeatedly performed.

If the extracted word is not a "dining"-related keyword, i.e., NO at S121, the process proceeds to S141, as shown in FIG. 9. It is then determined whether or not the extracted word is a "relaxation-related keyword. If the extracted word is a "relaxation"-related keyword, i.e., YES at S141, it is determined that the user has "relaxation preferences", and the determination result is passed to the destination supposition and suggestion processor 78. For example, in the following conversation:

Driver: "I'm tired. Are you?"
Passenger: "Yes."

the keyword "tired" contained within the "relaxation preferences" is detected, and it is determined that the vehicle occupants have "relaxation preferences".

Upon receipt of the determination result that a user has "relaxation preferences", the destination supposition and suggestion processor 78 refers to the user preference database 75 to determine a user's preference relevant to the "relaxation preferences". It then audibly suggests one candidate relaxation type based on the preferences (S142). For example, the destination supposition and suggestion processor 78 may suggest:

"Let's relax at a family restaurant." (4a)

If the suggested relaxation type does not satisfy a user, i.e., NO at S143, then another candidate relaxation type is suggested. The same procedure is repeated until a suggested relaxation type satisfies a user. If a user responds to the suggestion (4a) affirmatively, for example by:

"Yes, let's." (4b)

then the process proceeds to S144. Specifically, an appropriate destination is determined based on information such as facilities information, traffic information, and history data (S144), to audibly suggest an appropriate destination (S145).

For example, in response to an acceptance (4b), with reference to the user selection history database 76, it is determined that a user's favorite family restaurant is "Denny's". As a result, "Denny's" is searched from the facilities information database 77, and a candidate "Denny's", which requires the shortest travel time, is suggested. For example, one candidate destination (Denny's, Makuhari store) is suggested as follows:

"How about Denny's, Makuhari store? It will take 5 minutes to go there."

If the suggested destination does not satisfy a user, i.e., NO at S426, then another candidate relaxation area (destination) is suggested. The same operation is repeatedly performed until a suggested destination satisfies a user. The destination supposition and suggestion processor 78 then enters, through the navigation instruction unit 51, the suggested destination which satisfies a user as the final destination to the navigation controller 18. (see FIG. 1) (S147). The navigation controller 18 then finds a route to the entered destination, and navigates the vehicle to that destination. The destination supposition and suggestion processor 78 records the selected relaxation type and destination as history data in the user selection history database 76 (S148). The process then returns to the start step, and the same operation is repeatedly performed.

The illustrated embodiment provides procedures to determine a final destination and to find a route to the final destination. The steps include determining a user's preference, suggesting the associated preference type, suggesting an appropriate destination if a user is satisfied with the suggested preference type, and finding a route to that destination if a user is satisfied with the suggested destination. However, various modifications may be made. For example:

(1) The keyword "restroom" may be used to search for restrooms or for facilities having restrooms in the neighborhood.

(2) Based on the keyword "hungry", and the current time of day, a question may be asked as to the desired food type, such as "what do you want to eat?" If a user responds using keywords such as "ramen noodles", "curry", "Japanese food", or "any food", the system may list restaurants or food shops in the neighborhood fitting the criteria. Once a user selects the desired destination, a route to that destination is found and displayed.

(3) When there are many vehicle occupants, in response to the keyword "where", appropriate sightseeing areas may be suggested. When there is only a driver, an appropriate destination may be suggested according to the driver's preference and convenience.

(4) The detected keywords and a user's desired destination may be used to predict a user's interests. For example, when a user reaches a fishing area, information about fishing shops, such as those which sell bait, may be provided.

(5) A user's schedule may be previously downloaded from the PDA terminal 21. As a result, a further suggestion may be made, such as "You'll want to practice golf, won't you?"

While the invention has been described in conjunction with several embodiments and working examples, a variety of other modifications and variations are possible without departing from the spirit and scope of the invention as defined by the following claims. The invention is not intended to exclude such modifications and variations.

What is claimed is:

1. A navigation system having a navigation controller for finding a route to a set final destination, for displaying the found route along with a map covering a vehicle's position, and for navigating the vehicle to the final destination, said navigation system comprising:
   a voice recognition unit for recognizing a predetermined word from spoken utterances of a user;
   a destination supposition and suggestion unit for providing a suggested destination based on a user's utterances; and
   a destination entry unit for entering the suggested destination as the final destination for said navigation controller.

2. A navigation system according to claim 1, wherein said destination and suggestion unit is operable to provide the suggested destination audibly.

3. A navigation system according to claim 1, further comprising:
   a word data storage unit for storing words that indicate user preferences;
   a preference data storage unit for storing preference data for user preferences; and
   a facilities information storage unit for storing facilities information for each facility;
   wherein said destination supposition and suggestion unit provides a destination type according to data in the word data storage unit, the preference data storage unit, and the facilities information storage unit.

4. A navigation system according to claim 1, further comprising:
   a word data storage unit for storing words that indicate user preferences;
   a preference data storage unit for storing preference data for user preferences;
   an event information collection/storage unit for collecting and storing event information for each event,
   wherein said destination supposition and suggestion unit provides a destination type according to data in the word data storage unit, the preference data storage, and the event information collection/storage unit.

5. A navigation system according to claim 1, further comprising:
   a selection history storage unit for storing the selected items as history data,
   wherein said destination supposition and suggestion unit provides a destination based on said history data.

6. A navigation system according to claim 1, further comprising:
   a selection history storage unit for storing the selected items as history data,
   wherein said destination supposition and suggestion unit provides a destination type based on said history data.

7. A navigation system having a navigation controller for finding a route to a set final destination, for displaying the route along with a map covering a vehicle's position, and for navigating a vehicle to the final destination, said navigation system comprising:
   a user voice characteristic registering unit to register a voice of a user of the navigation system who frequently rides in the vehicle;
   a user identifying unit to identify a user by the voice registered by said user voice characteristic registering unit;
   a voice recognition unit for recognizing a predetermined word from spoken utterances of a user identified by the user identifying unit;
   a destination supposition and suggestion unit for predicting a destination based on one or more utterances identified by said voice recognition unit; and
   a destination entry unit for entering the suggested destination as the final destination for said navigation controller.

8. A navigation system according to claim 7, wherein said destination and suggestion unit is operable to provide the suggested destination audibly.

9. A navigation system according to claim 7, further comprising:
   a word data storage unit for storing words that indicate user preferences;
   a preference data storage unit for storing preference data for the preferences of a user registered in said user voice characteristic registering unit; and
   a facilities information storage unit for storing facilities information for each facility;
   wherein said destination supposition and suggestion unit provides a destination type according to data in the word data storage unit, the preference data storage unit, and the facilities information storage unit.

10. A navigation system according to claim 7, further comprising:
   a word data storage unit for storing words that indicate user preferences;
   a preference data storage unit for storing preference data for the preferences of a user registered in said user voice characteristic registering unit; and
   an event information collection/storage unit for collecting and storing event information for each event,
   wherein said destination supposition and suggestion unit provides a destination type according to data in the word data storage unit, the preference data storage unit, and the event information collection/storage unit.

11. A navigation system according to claim 7, further comprising:
   a selection history storage unit for storing the selected items as history data,
   wherein said destination supposition and suggestion unit provides a destination based on said history data.

12. A navigation system according to claim 7, further comprising:
   a selection history storage unit for storing the selected items as history data,
   wherein said destination supposition and suggestion unit provides an appropriate destination type based on said history data.

13. A method of navigating a vehicle to a final destination comprising the acts of:
   providing a navigation system having a navigation controller;
   receiving a spoken utterance from a user in the voice recognition unit;
   identifying a predetermined word from the spoken utterance;
   identifying one or more destinations utilizing the predetermined word;
   suggesting a desired destination; and
   providing the desired destination to the navigation controller.

14. The method of claim 13 further comprising the act of reviewing history data.

15. The method of claim 13 wherein the act of suggesting a desired destination is performed audibly.

16. The method of claim 13 further comprising the act of confirming the desired destination.

17. The method of claim 16 wherein the act of confirming the desired destination is performed audibly.

18. A method of navigating a vehicle to a final destination comprising:
   providing a navigation system having a navigation controller, a user voice characteristic registering unit, a user identifying unit, a voice recognition unit, a destination supposition and suggestion unit, and a destination entry unit;
   registering a voice of a frequent user of the navigation system utilizing said user voice characteristic registering unit;
   identifying a user, by the voice registered by said user voice characteristic registering unit, utilizing said user identifying unit;
   recognizing a predetermined word, from spoken utterances of a user identified by the user identifying unit, utilizing said voice recognition unit;
   predicting a destination, based on one or more utterances identified by said voice recognition unit, utilizing said destination supposition and suggestion unit; and
   entering the suggested destination as the final destination, for said navigation controller, utilizing said destination entry unit.

19. The method of claim 18, wherein said destination and suggestion unit is operable to provide the suggested destination audibly.

* * * * *